(12) United States Patent
Bahgat Shehata et al.

(10) Patent No.: US 10,521,897 B2
(45) Date of Patent: Dec. 31, 2019

(54) USING PHOTONIC EMISSION TO DEVELOP ELECTROMAGNETIC EMISSION MODELS

(71) Applicant: INTERNATIONAL BUSINESS MACHINES CORPORATION, Armonk, NY (US)

(72) Inventors: Andrea Bahgat Shehata, White Plains, NY (US); Peilin Song, Lagrangeville, NY (US); Franco Stallari, Waldwick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 15/217,074

(22) Filed: Jul. 22, 2016

(65) Prior Publication Data

US 2018/0027003 A1 Jan. 25, 2018

(51) Int. Cl.
*G06F 21/56* (2013.01)
*G06T 7/00* (2017.01)
(Continued)

(52) U.S. Cl.
CPC .......... *G06T 7/001* (2013.01); *G01R 29/0814* (2013.01); *G06F 17/5031* (2013.01); *G06F 21/56* (2013.01); *G06F 21/564* (2013.01); *H04K 3/00* (2013.01); *H04L 63/1416* (2013.01); *H04L 63/162* (2013.01); *G06F 11/263* (2013.01); *H04K 3/82* (2013.01); *H04K 2203/14* (2013.01)

(58) Field of Classification Search
None
See application file for complete search history.

(56) References Cited

U.S. PATENT DOCUMENTS

| 3,991,302 A | * | 11/1976 | Danner | G01N 25/72 324/501 |
| 5,940,545 A | * | 8/1999 | Kash | G01R 31/311 382/312 |

(Continued)

OTHER PUBLICATIONS

Kramer et al; Differential Photonic Emission Analysis; 2013; Retrieved from the Internet <URL: https://pdfs.semanticscholar.org/8897/4a606477009f4246aef7b3536df1398fd0a0.pdf>; pp. 1-16, as printed. (Year: 2013).*

(Continued)

*Primary Examiner* — Saleh Najjar
*Assistant Examiner* — Michael W Chao
(74) *Attorney, Agent, or Firm* — Intelletek Law Group, PLLC; Gabriel Daniel, Esq.

(57) ABSTRACT

A method and apparatus related to developing electromagnetic emission and power models for a target device using photonic emissions thereof are provided. Data of photonic emissions of a target device during a first period of time with the target device in one or more modes is recorded. Data of electromagnetic emissions of the target device during the first period of time with the target device in the one or more modes is also recorded. The recorded data of the photonic emissions and the recorded data of the electromagnetic emissions are correlated to establish one or more electromagnetic emission models for the target device. The one or more electromagnetic emission models enable predictive analysis of emissions by the target device.

20 Claims, 12 Drawing Sheets

(51) Int. Cl.
*G06F 17/50* (2006.01)
*H04L 29/06* (2006.01)
*G01R 29/08* (2006.01)
*H04K 3/00* (2006.01)
*G06F 11/263* (2006.01)

(56) References Cited

U.S. PATENT DOCUMENTS

| | | | | |
|---|---|---|---|---|
| 6,172,512 | B1* | 1/2001 | Evans | G01R 31/311 324/762.02 |
| 6,342,701 | B1* | 1/2002 | Kash | G01J 3/2889 250/458.1 |
| 6,496,022 | B1* | 12/2002 | Kash | G01R 31/311 324/754.23 |
| 6,625,769 | B1* | 9/2003 | Huott | G01R 31/308 714/725 |
| 6,727,712 | B2* | 4/2004 | Sabey | G01R 31/2805 324/527 |
| 6,737,880 | B2 | 5/2004 | Samaan et al. | |
| 6,943,578 | B1* | 9/2005 | Sanda | G01R 31/308 324/762.02 |
| 7,039,884 | B2* | 5/2006 | Kitchin | G01R 31/311 382/151 |
| 7,378,859 | B2 | 5/2008 | Stellari et al. | |
| 7,774,662 | B2* | 8/2010 | Motika | G01R 31/31854 714/726 |
| 7,821,276 | B2* | 10/2010 | Swenton | G01R 31/31813 324/754.23 |
| 7,852,102 | B2 | 12/2010 | Kitagawa et al. | |
| 7,872,485 | B2* | 1/2011 | Colvin | G01R 31/311 324/754.21 |
| 8,107,718 | B2 | 1/2012 | Breton et al. | |
| 8,131,056 | B2* | 3/2012 | Polonsky | G06T 7/001 382/141 |
| 8,750,595 | B2* | 6/2014 | Stellari | G06T 7/30 382/149 |
| 9,268,938 | B1* | 2/2016 | Aguayo Gonzalez | G01R 21/00 |
| 9,970,986 | B2* | 5/2018 | Hampel | G06F 21/73 |
| 10,055,585 | B2* | 8/2018 | Dalcher | G06F 21/566 |
| 10,074,580 | B2* | 9/2018 | Onabajo | G06F 21/552 |
| 10,094,874 | B1* | 10/2018 | Tangyunyong | G01R 31/307 |
| 10,094,877 | B2* | 10/2018 | Corrochano | G01J 1/0228 |
| 10,210,329 | B1* | 2/2019 | Malik | G06F 21/554 |
| 10,291,631 | B2* | 5/2019 | Hayrynen | H04L 63/1416 |
| 2004/0041575 | A1* | 3/2004 | Desplats | G01R 31/2656 324/762.09 |
| 2005/0024057 | A1* | 2/2005 | Desplats | G01R 31/311 324/334 |
| 2006/0220664 | A1* | 10/2006 | Stellari | G01R 31/311 324/754.23 |
| 2006/0232284 | A1* | 10/2006 | Condon | G01R 31/302 324/750.3 |
| 2007/0004063 | A1* | 1/2007 | Aghababazadeh | G01R 31/2831 438/18 |
| 2008/0164414 | A1* | 7/2008 | Stellari | G01J 3/443 250/347 |
| 2008/0284453 | A1* | 11/2008 | Swenton | G01R 31/31813 324/750.23 |
| 2011/0280468 | A1* | 11/2011 | Song | G01R 31/311 382/147 |
| 2015/0162872 | A1 | 6/2015 | Nakanishi et al. | |
| 2017/0131350 | A1* | 5/2017 | Song | G01R 31/311 |
| 2017/0228562 | A1* | 8/2017 | Guilley | G06F 21/75 |
| 2018/0032760 | A1* | 2/2018 | Hu | G06F 21/556 |
| 2018/0268141 | A1* | 9/2018 | Hagen | G06F 17/30097 |
| 2018/0284026 | A1* | 10/2018 | Shao | G01R 23/17 |
| 2019/0137985 | A1* | 5/2019 | Cella | G05B 23/024 |
| 2019/0197237 | A1* | 6/2019 | Aguayo Gonzalez | G01R 21/00 |

OTHER PUBLICATIONS

Mateos et al.; A New Correlation Frequency Analysis of the Side Channel; 2010; Retrieved from the Internet <URL: https://dl.acm.org/citation.cfm?id=1873552>; pp. 1-8, as printed. (Year: 2010).*

Nedospasov et al.; Functional Integrated Circuit Analysis; 2012; Retrieved from the Internet <URL: http://ieeexplore.ieee.org/abstract/document/6224328/>; pp. 1-6, as printed. (Year: 2012).*

Tsang et al.; Picosecond imaging circuit analysis; 2000; retrieved from the Internet <URL: https://ieeexplore.ieee.org/document/5389152/>; pp. 1-21, as printed. (Year: 2000).*

Meynard et al.; Characterization of the Electromagnetic Side Channel in Frequency Domain; 2010; Retrieved from the Internet <URL: https://www.researchgate.net/publication/220848551>; pp. 1-19, as printed. (Year: 2010).*

IBM et al., "Multiple Waveform Acquisition in Image Mode electro-Beam Testing," IBM TDB, 10(88) (1988).

S. Polonsky et al., "Non-Invasive Timing Analysis of IBM G6 Microprocessor L1 Cache Using Picosecond Imaging Circuit Analysis," ACM '00 Proceedings of the 9th Asian Test Symposium (2000).

* cited by examiner

USING PHOTONIC EMISSION TO DEVELOP ELECTROMAGNETIC EMISSION MODELS

BACKGROUND

Technical Field

The present disclosure generally relates to electromagnetic (EM) emission of integrated circuits, and more particularly, to the correlation of EM emission measurements with photonic emission data for developing predictive EM emission models.

Description of the Related Art

With continuous scale-down of the dimensions of transistors of modern complementary-metal-oxide-semiconductor (CMOS) technology, the complexity and density of present system-on-chips (SoC) integrated circuits have increased dramatically for the past two decades. The overall power and operation speeds of large SoC's are also on the rise, leading to enhanced EM emission and risk of information leak. EM emission is caused by changes of current and/or voltage of millions of transistors inside an integrated circuit, and could exhibit specific patterns or signatures related to certain activities of circuit blocks as well as sub-circuit blocks of the integrated circuit. Thus, secure data or information can be compromised by analyzing the EM emission signatures of an electronic hardware. For example, a smart card emits different amounts of EM emission during computation depending on the instructions and data being executed. Some sophisticated statistical techniques such as differential EM analysis can detect variations in EM emission so small that individual key bits can be identified. As security threats soar from various side channel attacks, new capabilities to remotely detect unexpected execution of programs of chip operations are necessary to protect sensitive information.

SUMMARY

According to an embodiment of the present disclosure, a method of remote detection and classification of changes in execution of programs and potential activation of malware(s) for a target device is provided. Electromagnetic emissions of the target device in a test context are measured. An anomaly condition associated with the target device is identified by comparing a result of the measuring to one or more electromagnetic emission models developed for the target device based on photonic emissions of the target device in a baseline context. The anomaly condition includes a change in execution of one or more programs by one or more circuit blocks of an integrated circuit of the target device, activation of a malware on the target device, or both.

In one embodiment, the one or more electromagnetic emission models for the target device are developed based on the photonic emissions of the target device in the baseline context by recording data of the photonic emissions of the target device using Time Resolved Emission (TRE), also known as Picosecond Imaging Circuit Analysis (PICA), during a first period of time with the target device in one or more modes; recording data of the electromagnetic emissions of the target device during the first period of time with the target device in the one or more modes; and correlating the recorded data of the photonic emissions and the recorded data of the electromagnetic emissions to establish the one or more electromagnetic emission models for the target device. Data of the electromagnetic emissions of the target device is recorded during a second period of time after the first period of time with the target device in at least one of the one or more modes.

According to another embodiment of the present disclosure, a method of developing one or more electromagnetic emission models for a target device is provided. Data of photonic emissions of the target device is recorded using Picosecond Imaging Circuit Analysis (PICA) during a first period of time with the target device in one or more modes. Data of electromagnetic emissions of the target device is recorded during the first period of time with the target device in the one or more modes. The recorded data of the photonic emissions and the recorded data of the electromagnetic emissions are correlated to establish one or more electromagnetic emission models for the target device.

In one embodiment, at least one operation of multiple operations is performed. A first operation, based on the one or more electromagnetic emission models in a time domain, performs one or more of: (1) enabling temporal aggregation of electromagnetic emission waveforms associated with the target device corresponding to a targeted event, (2) identifying one or more time frames of interest, and (3) improving a SNR in the electromagnetic emission waveforms associated with the target device. A second operation, based on the one or more electromagnetic emission models in a frequency domain, performs one or more of: (1) isolating a frequency of interest, (2) improving the SNR in electromagnetic emission waveforms associated with the target device, and (3) developing spectral signatures associated with one or more circuit behaviors of an integrated circuit of the target device. A third operation, based on the one or more electromagnetic emission models in a spatial domain, identifies a region of interest associated with one or more circuit blocks of the integrated circuit of the target device. A fourth operation, based on the one or more electromagnetic emission models in the spatial domain, identifies one or more locations of the target device associated with a matching photonic emission signature in time to associate the identified one or more locations of the target device to a specific electromagnetic emission signature associated with the target device.

According to another embodiment of the present disclosure, an apparatus is provided. The apparatus comprises a photonic emission measurement unit configured to measure and record data of photonic emissions of a target device with the target device in one or more modes, an electromagnetic emission measurement unit configured to measure and record data of electromagnetic emissions of the target device with the target device in the one or more modes, a data analysis unit configured to analyze the recorded data of the photonic emissions and the recorded data of the electromagnetic emissions to provide an analysis result, and a control unit. The control unit is configured to apply one or more inputs of electrical stimuli to an integrated circuit of the target device to place the target device in the one or more modes to perform one or more operations in at least one mode of the one or more modes. The control unit is also configured to correlate the recorded data of the photonic emissions and the recorded data of the electromagnetic emissions based on the analysis result to establish one or more electromagnetic emission models for the target device. The photonic emission measurement unit is configured to record the data of the photonic emissions of the target device using PICA.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
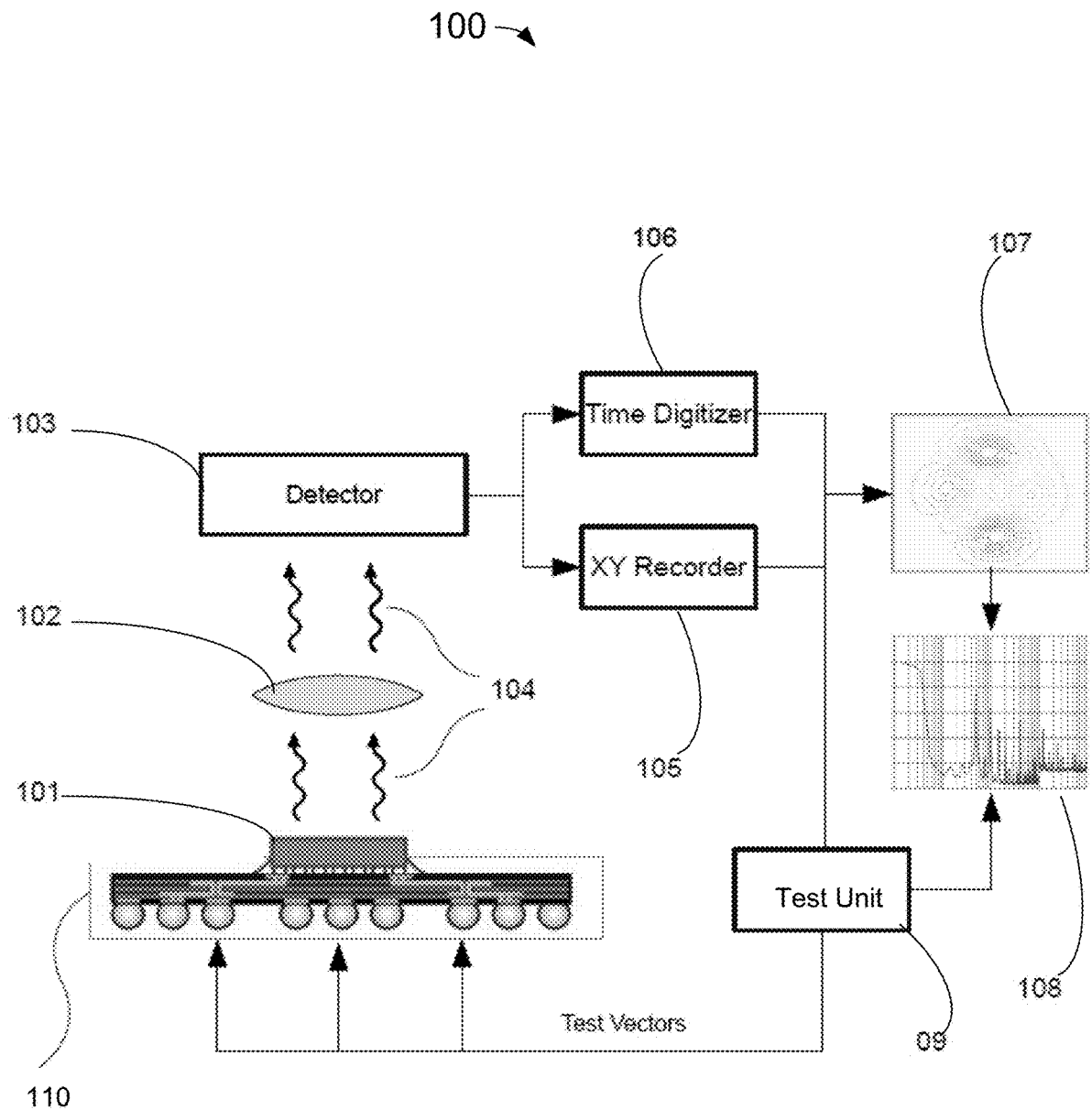
FIG. 1 is a block diagram of an example system that can measure photonic emission from a device under test, consistent with an exemplary embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to EM emission of integrated circuits, and more particularly, to the correlation of EM emission measurements with photonic emission data for developing predictive EM emission models. A system according to various embodiments of the present disclosure may be able to remotely detect and classify changes in execution of program(s) by a target device and/or activation of malware(s) (e.g., one or more hardware Trojans, viruses, worms, ransomwares, spywares, adwares, scarewares and/or any other types of malicious programs or intrusive software) on the target device based on a comparison of measured EM emissions of one or more circuit blocks of an integrated circuit within the target device to EM emission models developed using photonic emission data. The development of the EM emission models may leverage analysis of the run-time behavior of the circuit blocks within a target device to be monitored, measurement of the target device's EM emission properties in a range of sensor modalities, correlation of EM emission models to the target device's emission behavior, and the development of algorithms that utilize models and measurements. The EM emission models enable classification of observed device behavior. Moreover, electromagnetic emission and power models for a target device may be developed using photonic emission data of the target device to create dynamic behavior-to-emission mapping and enable predictive analysis of emissions by the target device.

According to various embodiments of the present disclosure, various types of photonic emission data may be utilized in the development of EM emission models (and power models). For illustrative purposes and without limitation, description of photonic emission data in various embodiments may use Picosecond Imaging Circuit Analysis (PICA) as an example, although other types of photonic emission analysis and techniques may be utilized as well. For example, the following is a non-exhaustive list of viable photonic emission data that can be recorded or otherwise utilized for the intended purpose of the present disclosure: time-integrated two-dimensional images of PICA, time-resolved PICA waveforms corresponding to regions of interest of the target device, single point Time-Resolved Emission (TRE), Laser Voltage Probe (LVP) waveforms from a single point of the target device, LVP two-dimensional images with a raster scanner, and time-integrated two-dimensional images of Photonic Emission Microscopy (PEM), InfraRed (IR) and thermal imaging.

In various embodiments of the present disclosure, PICA may be utilized to create underlying EM emission models and power models for a target device, and such models may be leveraged to improve the dynamic behavior-to-EM emission mapping as well as enable predictive analysis of EM emission. Additionally, PICA may be utilized to map exact timing, frequency and spatial activities from transistor level to functional block level in an integrated circuit chip of the target device. This information may be correlated with EM emission measurements and power measurements to develop EM emission models and power models. Moreover, PICA data may provide a detailed "golden" reference for EM simulation models to be developed for the target device.

It is noteworthy that, although examples provided in the present disclosure may relate to measurement of EM emissions and development of EM emission models, the concepts, schemes and techniques described herein may be applicable to measurement of electric power consumed by a target device as well as the development of power models for the target device. That is, power models may be developed from correlation of photonic emission data and power data, and can be used to remotely detect and classify changes in execution of program(s) by the target device and/or activation of malware(s) on the target device.

Example Systems

FIG. 1 is a block diagram of an example system 100 that can measure photonic emission from a device under test, consistent with an exemplary embodiment. Referring to FIG. 1, a photonic emission analysis technique in accordance with the present disclosure, such as PICA, may be based on collection of light emitted from the channel of a transistor, e.g., complementary metal-oxide-semiconductor (CMOS) transistor, upon switching of its gate from OFF to ON and from OFF to ON. Light emission by transistors may originate from several mechanisms that involve transitions of hot carriers between energy bands. Photons escaped out of a silicon body may be captured by a detector, which records the time of arrival of the photons as well as the positions on a target device from which the photons are originated. In the setup of system 100, the back side of an integrated circuit of a target device (herein interchangeably referred to as a device under test or DUT) 101 may be exposed from a packaged frame 110. A test unit 109 may apply electrical stimuli or signals to DUT 101 to induce a variety of electrical activities and/or activate one of more circuit blocks of the integrated circuit of DUT 101 to perform various operations. Photons 104 emitted from the back side of DUT 101 may be directed into a field of view of a photon detector 103 through an imaging lens 102. An XY recorder 105 and a time digitizer 106, coupled to detector 103, may be configured to measure and record positions (e.g., in X-Y coordinates) and arrival times of photons in the field of view of photon detector 103 according to the resolution of photon detector 103. In some embodiments, photon detector 103 may operate in a single-photon-counting mode with about 100 picosecond Full-Width-Half-Maximum (FWHM) time resolution, resulting in high noise rejection and fine time-resolved spectra. In some embodiments, the spatial resolution of photon detector 103 may be about 400 nm, enabling a two-dimensional image mode. Resulting images 107, based on outputs of XY recorder 105 and time digitizer 106, may be constructed from a large number of single-photon events by integrating the emissions of all the switched transistors in the field of view of photon detector 103. Time-resolved photonic emission waveforms 108 may be derived from one or more region of interest in images 107, in relation to timing of signals provided by test unit 109, by resolving the images in the region(s) of interest in the time domain. The ability to measure and correlate single-photon time-of-arrival together with single-photon two-dimensional spatial coordinates can lead to wide applications of PICA in failure analysis, security evaluation, and timing characterization of circuit blocks.

Other than photons, high-speed integrated circuits also radiate EM waves. The spectrum of EM emissions can be measured, and unique patterns at frequencies corresponding to gate switching times can be observed for particular operations of one or more circuit blocks of an integrated circuit of a target device such as DUT 101. While EM emissions may be used to characterize high frequency events, EM emissions nevertheless lack spatial resolution due to the geometric constraints of coupling networks or field probes which are responsible for registering the magnitudes and directions of radiated electric and magnetic vectors. Typically, EM emission wavelengths are on the order of millimeters and so are the field probes. It may be difficult to localize specific sub-circuit blocks or circuit blocks on the micrometer scale. Another complication arises from the fact that the measured EM signal may be a combination of multiple individual signals coming from different portion of the device of from ambient background noise.

Figure 2:
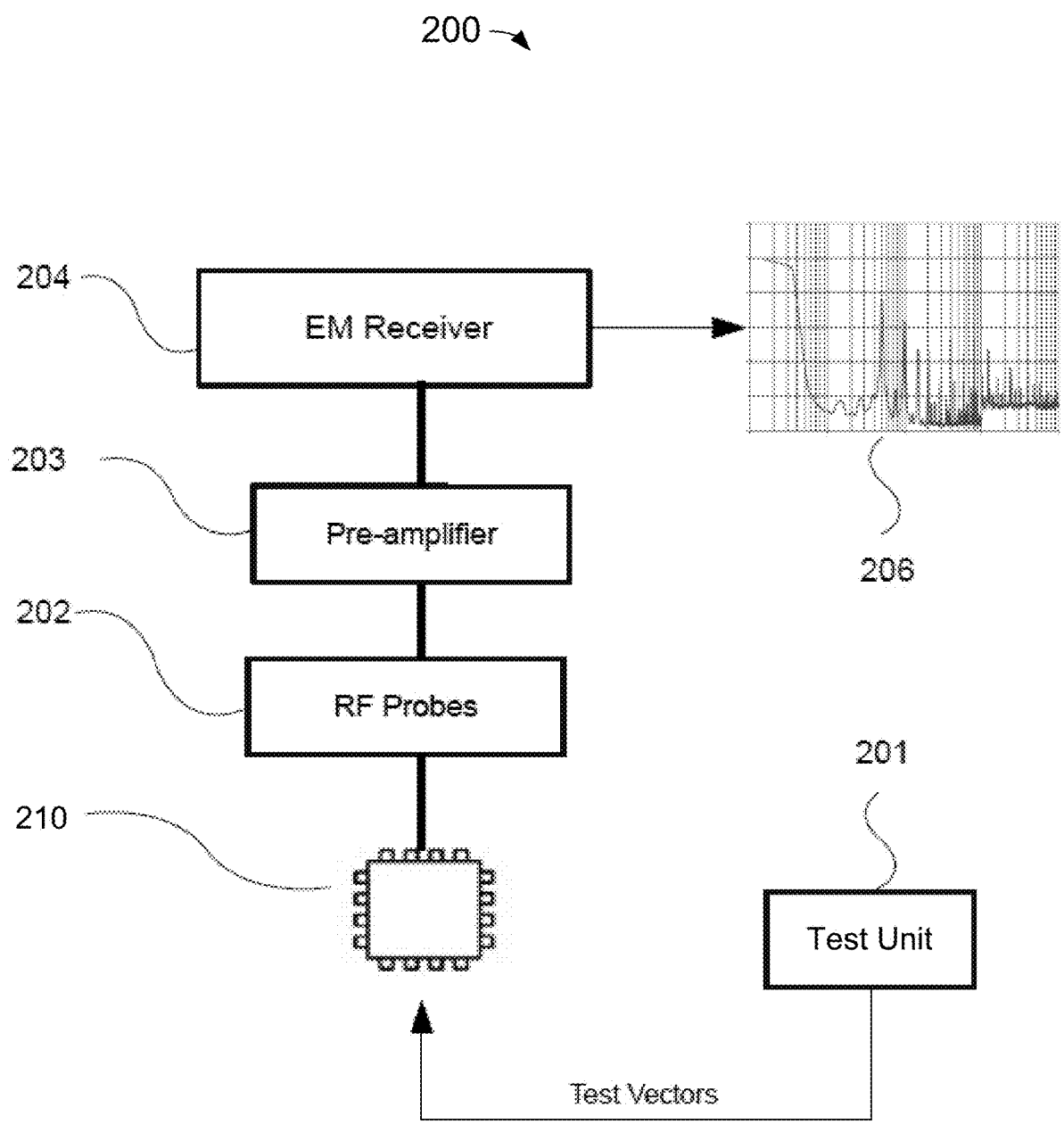
FIG. 2 is a block diagram of an example system that can measure EM emission from a device under test, consistent with an exemplary embodiment.

FIG. 2 is a block diagram of an example system 200 that can measure EM emission from a device under test, consistent with an exemplary embodiment. Referring to FIG. 2, a test unit 201 (possibly the same as 109) may apply electrical stimuli or signals to an integrated circuit 210 of a target device, which is under test, to induce a variety of electrical activities and/or activate one of more circuit blocks of the integrated circuit of integrated circuit 210 to perform various operations. Integrated circuit 210 may be connected to a radio frequency (RF) probe 202 with a predetermined load (not shown). The output of RF probe 202 may be amplified by a pre-amplifier 203 and fed to an EM emission receiver 204, which may be a spectrum analyzer. Time-resolved EM emission waveforms 108 may be derived from the output of EM emission receiver 204.

Example Apparatus

Figure 3:
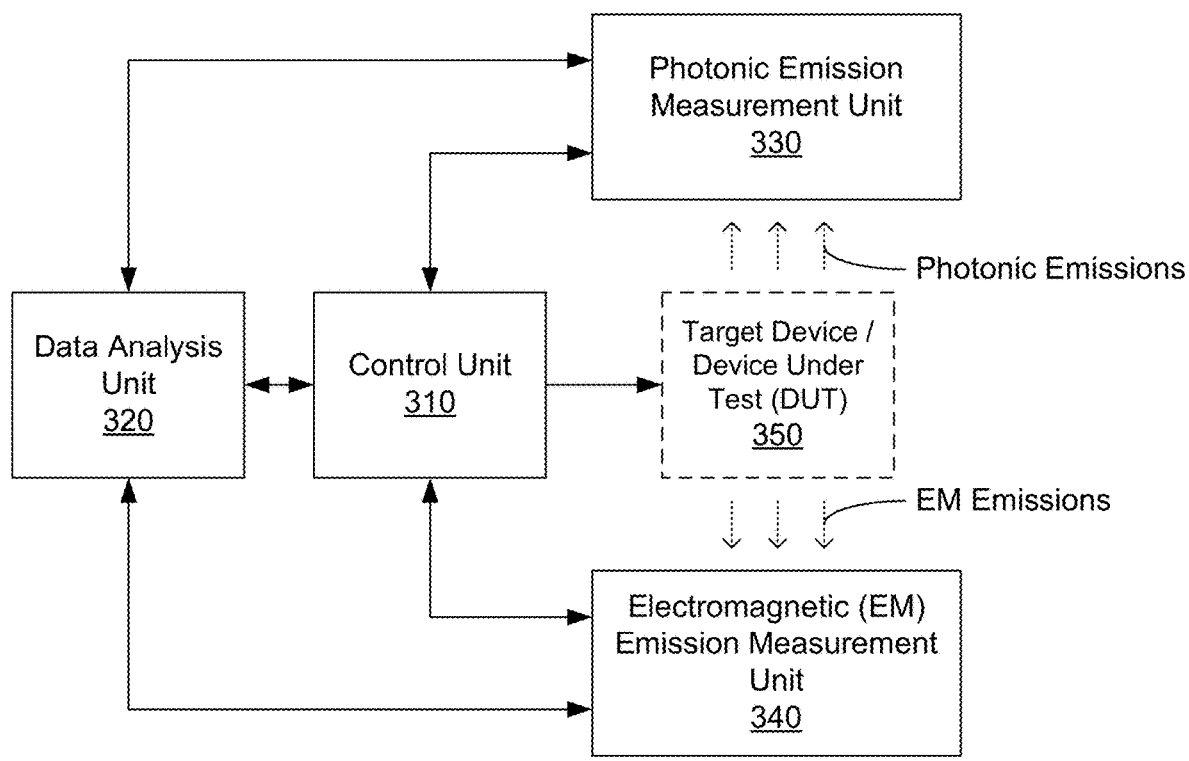
FIG. 3 is a block diagram of an example apparatus that can develop EM emission models and detect circuit anomalies, consistent with an exemplary embodiment.

FIG. 3 is a block diagram of an example apparatus 300 that can develop EM emission models and detect circuit anomalies, consistent with an exemplary embodiment. Apparatus 300 may include a photonic emission measurement unit 330, an electromagnetic emission measurement unit 340, a data analysis unit 320 and a control unit 310. In some embodiments, control unit 310 and data analysis unit 320 may be implemented in the form of separate and discrete integrated circuit chips or, alternatively, as integral parts of a single integrated circuit chip. In some embodiments, each of control unit 310 and data analysis unit 320 may be implemented in the form of an individual electronic device. In some embodiments, unit 310 and unit 320 may be implemented to be the same unit performing the actions/tasks of both units. In some embodiments, two or more of control unit 310, data analysis unit 320, photonic emission measurement unit 330 and EM emission measurement unit 340 may be integral parts of an electronic apparatus.

Control unit 310 may select a set of electrical stimuli and apply the electrical stimuli as input of a target device, or device under test (DUT) 350 for DUT 350 to perform various functional circuit operations. Control unit 310 may be communicatively coupled to photonic emission measurement unit 330 and EM emission measurement unit 340 to direct or otherwise initiate operations of photonic emission measurement unit 330 and EM emission measurement unit 340. The operational principles of photonic emission measurement unit 330 and EM emission measurement unit 340 are similar to those of system 100 and system 200, respectively, as described above, and thus will not be repeated. Each of photonic emission measurement unit 330 and EM emission measurement unit 340 may be communicatively coupled to data analysis unit 320 to output photonic emission data and EM emission data, respectively, to data analysis unit 320 for further data processing and analysis. Data analysis unit 320 may perform correlation analysis in the time and/or frequency domain for identifying common features, isolating interfere signals, and associating regions of interest with specific sub-circuit activities. Post-correlated EM emission data contain precise EM emission signatures since photonic emission data are not affected by external noise sources. Data analysis unit 320 may include a database of emission signatures, which may be established upon data analysis unit 320 completing correlation analysis of each of matching functional circuit operations by DUT 350 in response to multiple sets of electrical stimuli applied to DUT 350 by control unit 310.

Control unit 310 may apply one or more inputs of electrical stimuli to an integrated circuit of a target device, or DUT 350, to place DUT 350 in one or more modes (e.g., a standby mode, a low-power (sleep) mode and a normal operations mode) to perform one or more operations in at least one mode of the one or more modes. Photonic emission measurement unit 330 may measure and record data of photonic emissions of DUT 350, with DUT 350 being in the one or more modes. Electromagnetic emission measurement unit 340 may measure and record data of electromagnetic emissions of DUT 350 with DUT 350 being in the one or more modes. Data analysis unit 320 may analyze the recorded data of the photonic emissions and the recorded data of the electromagnetic emissions to provide an analysis result to control unit 310. Based on the analysis result, control unit 310 may correlate the recorded data of the photonic emissions and the recorded data of the electromagnetic emissions to establish one or more electromagnetic emission models for DUT 350.

In some embodiments, in correlating the recorded data of the photonic emissions and the recorded data of the electromagnetic emissions to establish the one or more electromagnetic emission models for DUT 350, control unit 310 may identify transistor switching activities in one or more circuit blocks of an integrated circuit of DUT 350 in PICA waveforms according to the recorded data of the photonic emissions of DUT 350. Control unit 310 may also correlate in the time domain the identified transistor switching activities to electromagnetic emission waveforms according to the recorded data of the electromagnetic emissions of DUT 350 to perform one or more operations. For example, the correlation may enable temporal aggregation of the electromagnetic emission waveforms corresponding to a targeted event. The correlation may also allow one or more time frames of interest to be identified. Moreover, the correlation may allow a signal-to-noise ratio (SNR) in electromagnetic emission waveforms associated with DUT 350 to be improved.

Alternatively or additionally, in correlating the recorded data of the photonic emissions and the recorded data of the electromagnetic emissions to establish the one or more electromagnetic emission models for DUT 350, control unit 310 may transform the recorded data of the photonic emissions of DUT 350 from the time domain to the frequency domain. Control unit 310 may also identify one or more frequency components in the recoded data of the photonic emissions of DUT 350 in the frequency domain based on one or more changing circuit behaviors of one or more circuit blocks of an integrated circuit of DUT 350. Control unit 310 may filter, using the identified one or more frequency components, electromagnetic emission spectra according to the recorded data of the electromagnetic emissions of DUT 350 to perform one or more operations. For example, the filtering may allow a frequency of interest to be isolated. The filtering may also allow a SNR in electromagnetic emission waveforms associated with DUT 350 to be improved. Furthermore, the filtering may allow spectral signatures associated with one or more circuit behaviors of the integrated circuit of DUT 350 to be developed.

In some embodiments, photonic emission measurement unit 330 may be configured to record the data of the photonic emissions of DUT 350 using PICA. In some embodiments, in recording the data of the photonic emissions of DUT 350 using PICA, photonic emission measurement unit 330 may record data of a first PICA emission image when DUT 350 is in a first mode of the one or more modes. Additionally, photonic emission measurement unit 330 may record data of a second PICA emission image when DUT 350 is in a second mode of the one or more modes. Moreover, data analysis unit 320 may compare the first PICA emission image and the second PICA emission image to provide a comparison result. Control unit 310 may identify a region of interest associated with one or more circuit blocks of an integrated circuit of DUT 350 based on the comparison result. In some embodiments, in correlating the recorded data of the photonic emissions and the recorded data of the electromagnetic emissions based on the analysis result to establish the one or more electromagnetic emission models for DUT 350, control unit 310 may correlate the one or more circuit blocks performing one or more activities in the region of interest during a first period of time to electromagnetic emission signatures recorded during the first period of time.

In some embodiments, data analysis unit 320 may analyze in time the data of the photonic emissions recorded during one or more circuit operations of DUT 350 corresponding to a specific electromagnetic emission signature associated with DUT 350 in time to identify matching photonic emission signature in time. Correspondingly, control unit 310 may identify one or more locations of DUT 350 associated with the identified matching photonic emission signature in time. Control unit 310 may also associate the identified one or more locations of DUT 350 to the specific electromagnetic emission signature.

In some embodiments, data analysis unit 320 may analyze in frequency the data of the photonic emissions recorded during one or more circuit operations of DUT 350 corresponding to a specific electromagnetic emission signature associated with DUT 350 in frequency to identify matching photonic emission signature in frequency. Correspondingly, control unit 310 may identify one or more locations of DUT 350 associated with the identified matching photonic emission signature in frequency. Control unit 310 may also associate the identified one or more locations of DUT 350 to the specific electromagnetic emission signature.

Example Apparatus and Graphs

Figure 4:
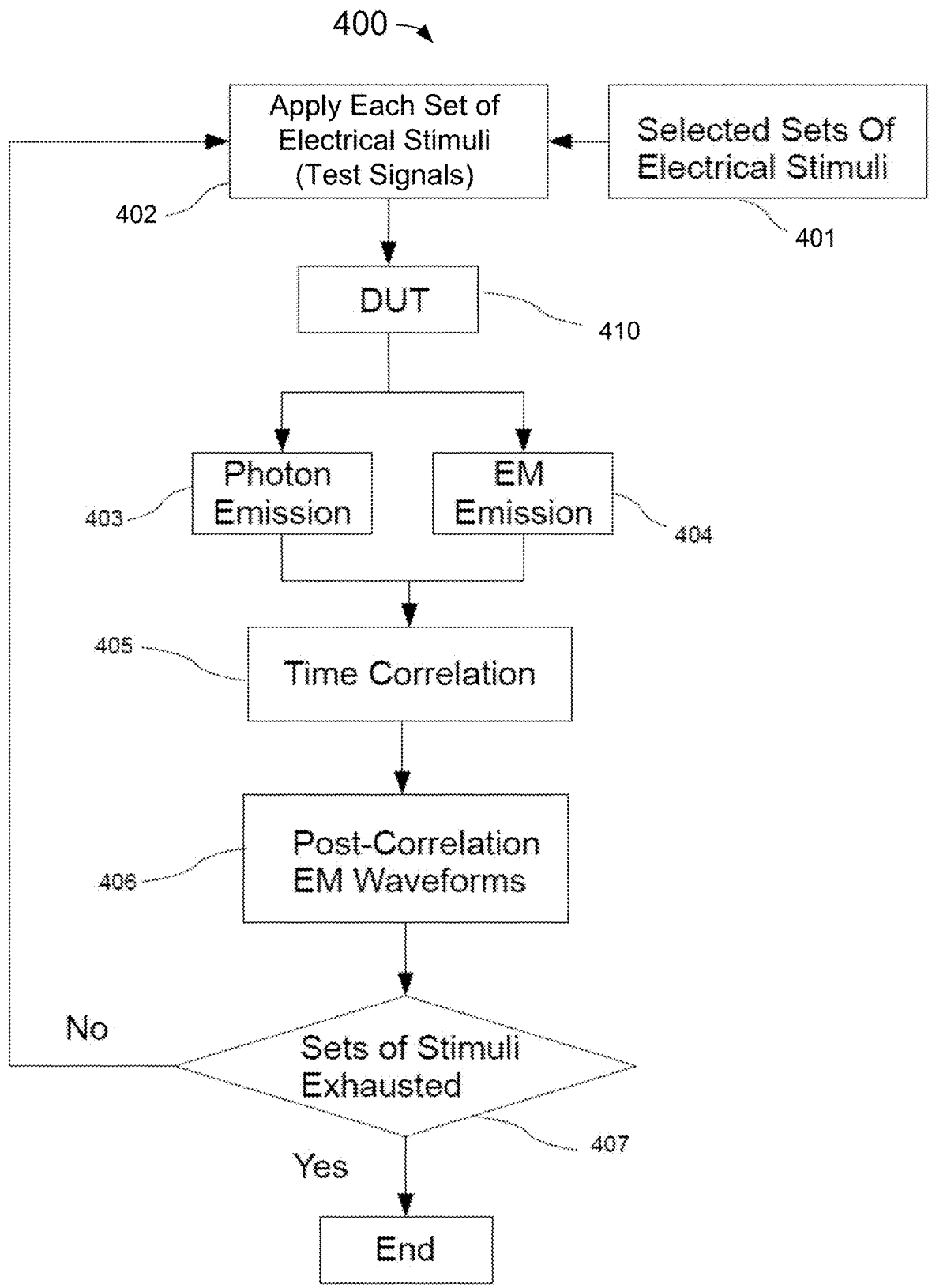
FIG. 4 illustrates an example algorithm that can develop EM emission models from correlation of photonic emission and EM emission data, consistent with an exemplary embodiment.

FIG. 4 illustrates an example algorithm 400 that can develop EM emission models from correlation of photonic emission and EM emission data, consistent with an exemplary embodiment. Algorithm 400 may include one or more operations, actions, or functions as represented by one or more of blocks 401, 402, 403, 404, 405, 406 and 407. Although illustrated as discrete blocks, various blocks of algorithm 400 may be divided into additional blocks, combined into fewer blocks, or eliminated, depending on the desired implementation. Algorithm 400 may be implemented by apparatus 300 in accordance with the present disclosure. For illustrative purposes and without limitation, algorithm 400 is described below in the context of apparatus 300.

At 401, one or more sets of electrical stimuli, as test signals, may be selected by control unit 310 of apparatus 300 for inducing or otherwise causing a variety of electrical activities and/or activate one of more circuit blocks of an integrated circuit of a target device or DUT 410 to perform various operations. At 402, each set of the one or more sets of electrical stimuli may be applied to DUT 410 by control unit 310. As various activities and/or operations in DUT 410 are induced by each set of electrical stimuli, photonic emissions as well as EM emissions by DUT 410 may result. At 403, photonic emissions from DUT 410 may be measured and recorded as photonic emission data by photonic emission measurement unit 330 of apparatus 300. At 404, EM emissions from DUT 410 may be measured and recorded as EM emission data by EM emission measurement unit 340 of apparatus 300. At 405, photonic and EM emission data may be taken as waveforms in the time domain and analyzed for time correlation by data analysis unit 320 of apparatus 300. During time correlation, the photonic emission waveforms and EM emission waveforms may be aligned in time by identifying common features of target events by data analysis unit 320. For example, a clock event or a power supply current spike may be used as an indication of temporal alignment. Thus, photonic emission waveforms enable identifying a time frame of interest in EM emission waveforms. Activities of individual gates of transistors or sub-circuits can be detected by photonic emission measurements. Background noise of EM emission waveforms caused by external radiation source can be reduced or eliminated if no activity is present in the photonic emission waveforms during the same time frame of interest. At 406, post-correlation EM emission waveforms may be generated after time correlation by data analysis unit 320. These waveforms bear improved SNR and temporal alignments to circuit activities. At 407, a check on the selection of electrical stimuli for testing may be performed by control unit 310. If there remains any set of electrical stimuli not yet applied to DUT 410, the above-described process of algorithm 400 may be repeated by control unit 310 until all sets of electrical stimuli have been applied to DUT 410 and resultant emission data measured and recorded.

In some embodiments, the sets of electrical stimuli may incorporate a change of a signal frequency, a change of a signal delay, a change of a duty cycle, a change of voltage, a change of a noise source, a change of temperature, or a change of combination thereof. In some embodiments, the sets of electrical stimuli may be constructed to produce a plurality of substantially similar signatures or patterns between EM emission waveforms and photonic emission waveforms.

In some embodiments, the photonic emission data may include time-resolved waveforms from a two-dimensional PICA image or LVP waveforms from a single point. In some embodiments, the EM emission data may include transverse EM transmission-line time-domain measurements or 1Ω/150Ω time-domain characterization.

Figure 5:
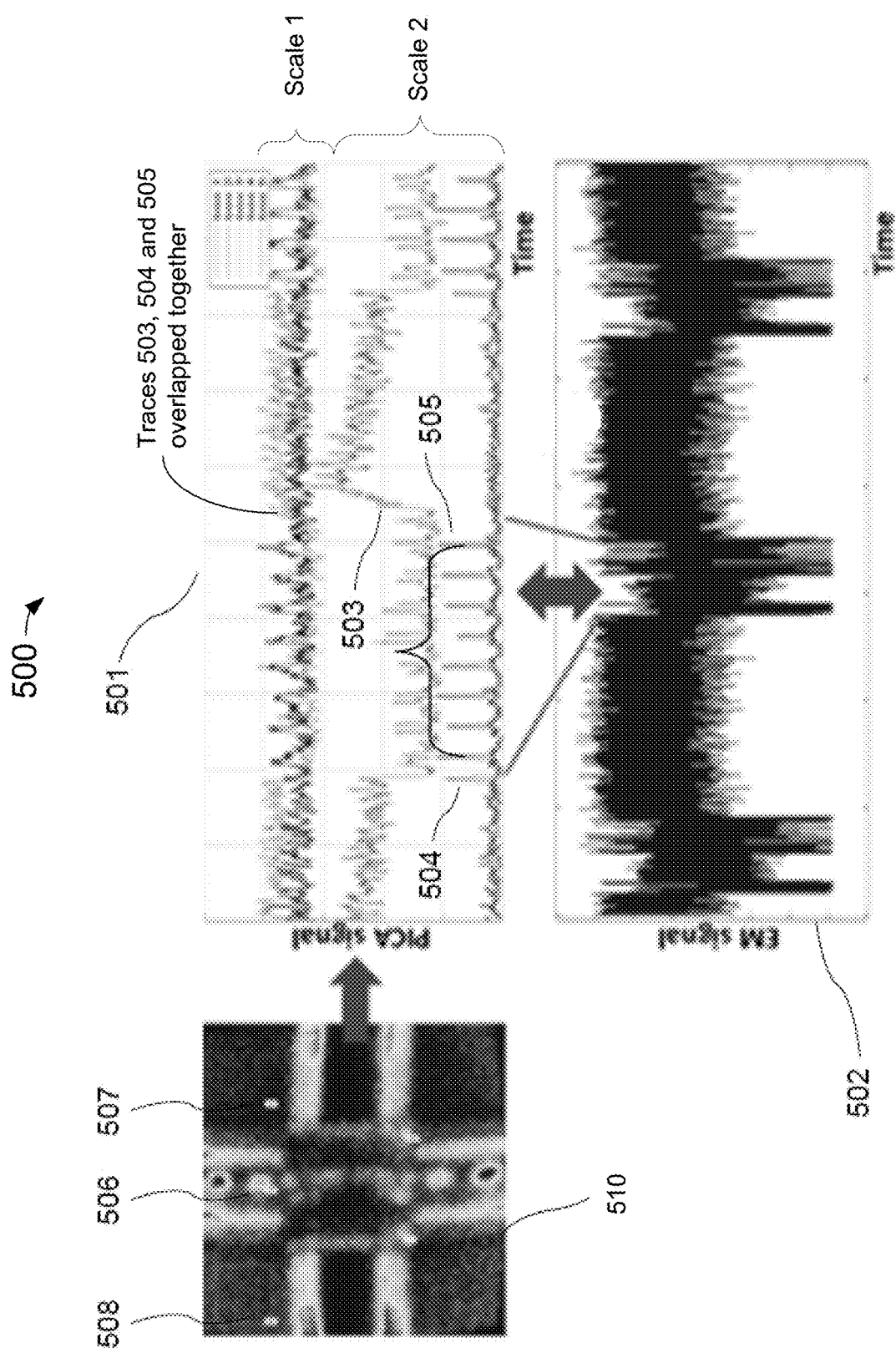
FIG. 5 illustrates an example of graphs of photonic emission waveforms and EM emission waveforms with respect to a device under test, consistent with an exemplary embodiment.

FIG. 5 illustrates an example 500 of graphs of photonic emission waveforms 501 and EM emission waveforms 502 with respect to a device under test, consistent with an exemplary embodiment. In example 500, photonic emissions and EM emissions are measured for an integrated circuit of a DUT, and both measurements may undertake the same set(s) of electrical stimuli to be applied to the integrated circuit. Photonic emission waveforms 501, including several individual traces, may be derived from a PICA two-dimensional time-integrated image 510. The three labeled individual waveform traces 503, 504, and 505 correspond to time-resolved signals from regions of interest of 506, 507, and 508, respectively, in the PICA image 510. In observation, waveform trace 504 has one peak while another waveform trace 505 has consecutive eight peaks. This one peak, as a signature, identifies a particular event in the integrated circuit and marks a time frame of interest. In this time frame, waveform trace 503 also has a level shift downward. EM emission waveform 502 under the same electrical stimuli is shown next to photonic emission waveforms 501. The temporal alignment of EM emission waveform 502 for the same event can be established by associating traces in the EM emission waveform 502 to changes in traces in photonic emission waveform 503.

Figure 6:
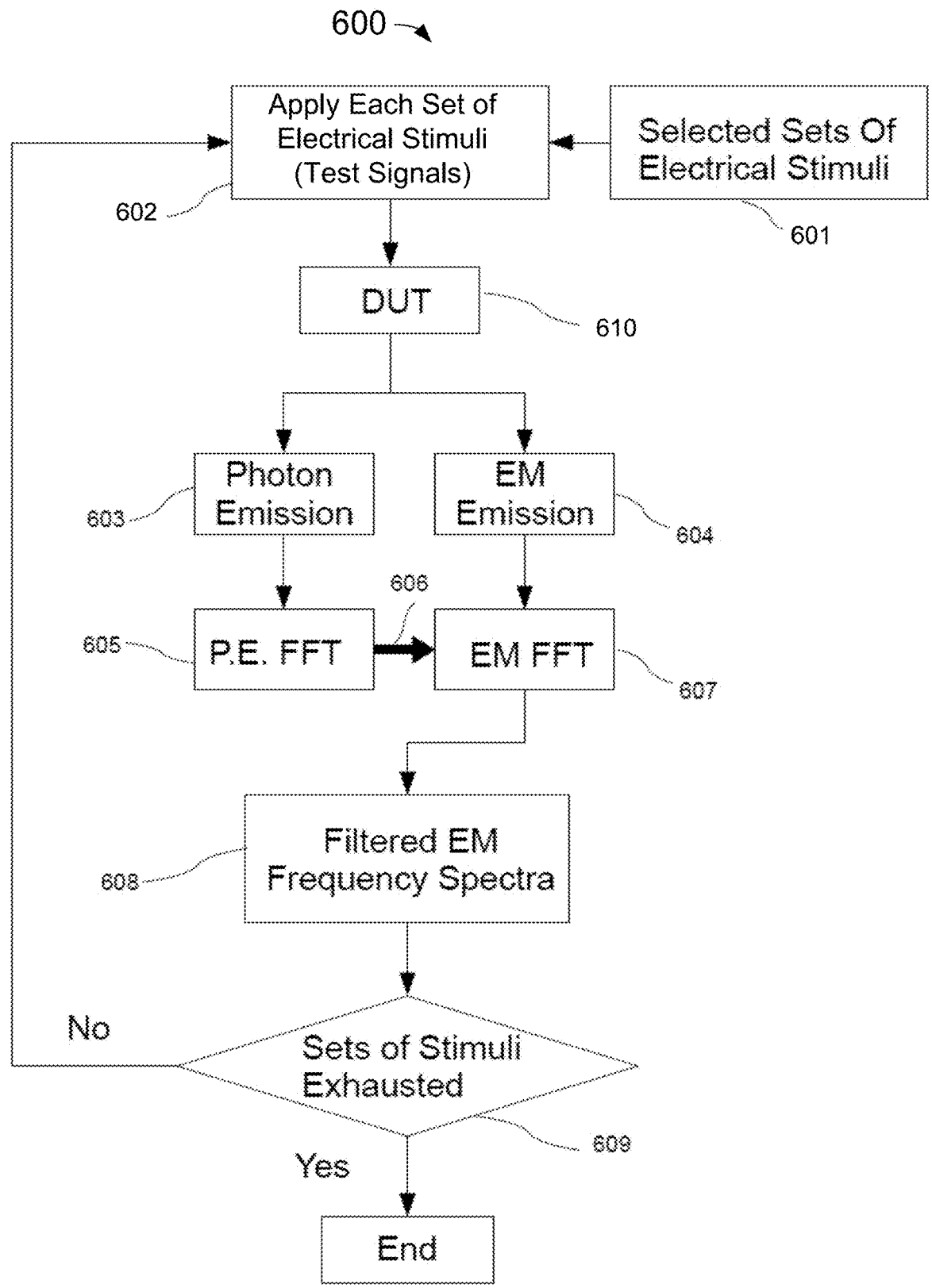
FIG. 6 illustrates an example algorithm that can convert photonic emission data and EM emission data into frequency domain to develop EM emission models, consistent with an exemplary embodiment.

FIG. 6 illustrates an example algorithm 600 that can convert photonic emission data and EM emission data into frequency domain to develop EM emission models, consistent with an exemplary embodiment. Algorithm 600 may include one or more operations, actions, or functions as represented by one or more of blocks 601, 602, 603, 604, 605, 607, 608 and 609. Although illustrated as discrete blocks, various blocks of algorithm 600 may be divided into additional blocks, combined into fewer blocks, or eliminated, depending on the desired implementation. Algorithm 600 may be implemented by apparatus 300 in accordance with the present disclosure. For illustrative purposes and without limitation, algorithm 600 is described below in the context of apparatus 300.

At 601, one or more sets of electrical stimuli, as test signals, may be selected by control unit 310 of apparatus 300 for inducing or otherwise causing a variety of electrical activities and/or activate one of more circuit blocks of an integrated circuit of a target device or DUT 610 to perform various operations. At 602, each set of the one or more sets of electrical stimuli may be applied to DUT 610 by control unit 310. As various activities and/or operations in DUT 610 are induced by each set of electrical stimuli, photonic emissions as well as EM emissions by DUT 610 may result. At 603, photonic emissions from DUT 610 may be measured and recorded as photonic emission data by photonic emission measurement unit 330 of apparatus 300. At 604, EM emissions from DUT 610 may be measured and recorded as EM emission data by EM emission measurement unit 340 of apparatus 300. Photonic and EM emission data may be taken as waveforms in the time domain and may be converted to emission spectra in the frequency domain using, for example, Fast Fourier Transformation (FFT), by data analysis unit 320 of apparatus 300. At 605, photonic emission waveforms in the time domain may be converted to photonic emission frequency spectra by data analysis unit 320. At 607, EM emission waveforms in the time domain may be converted to EM emission frequency spectra and analyzed to identify key frequency components by data analysis unit 320. Rejection of EM spectral components may be achieved by using photonic emission spectra response as a linear filter 606. The EM spectral components removed by this filtering action may often be caused by external interference. At 608, post-filtration EM emission waveforms may be generated by data analysis unit 320, and may tend to be easier to interpret if they are associated with specific events. At 609, a check on the selection of electrical stimuli for testing may be performed by control unit 310. If there remains any set of electrical stimuli not yet applied to DUT 610, the above-described process of algorithm 600 may be repeated by control unit 310 until all sets of electrical stimuli have been applied to DUT 610 and resultant emission data measured and recorded.

In some embodiments, the sets of electrical stimuli may incorporate a change of a signal frequency, a change of a signal delay, a change of a duty cycle, a change of voltage, a change of a noise source, a change of temperature, or a change of combination thereof. In some embodiments, the sets of electrical stimuli may be constructed to produce a plurality of substantially similar signatures or patterns between EM emission waveforms and photonic emission waveforms.

In some embodiments, the photonic emission data may include time-resolved waveforms from a single-point or two-dimensional PICA data, as well as LVP waveforms from a single or multiple point(s). In some embodiments, the EM emission data may include transverse EM transmission-line time-domain measurements or 1Ω/150Ω time-domain characterization.

Figure 7:
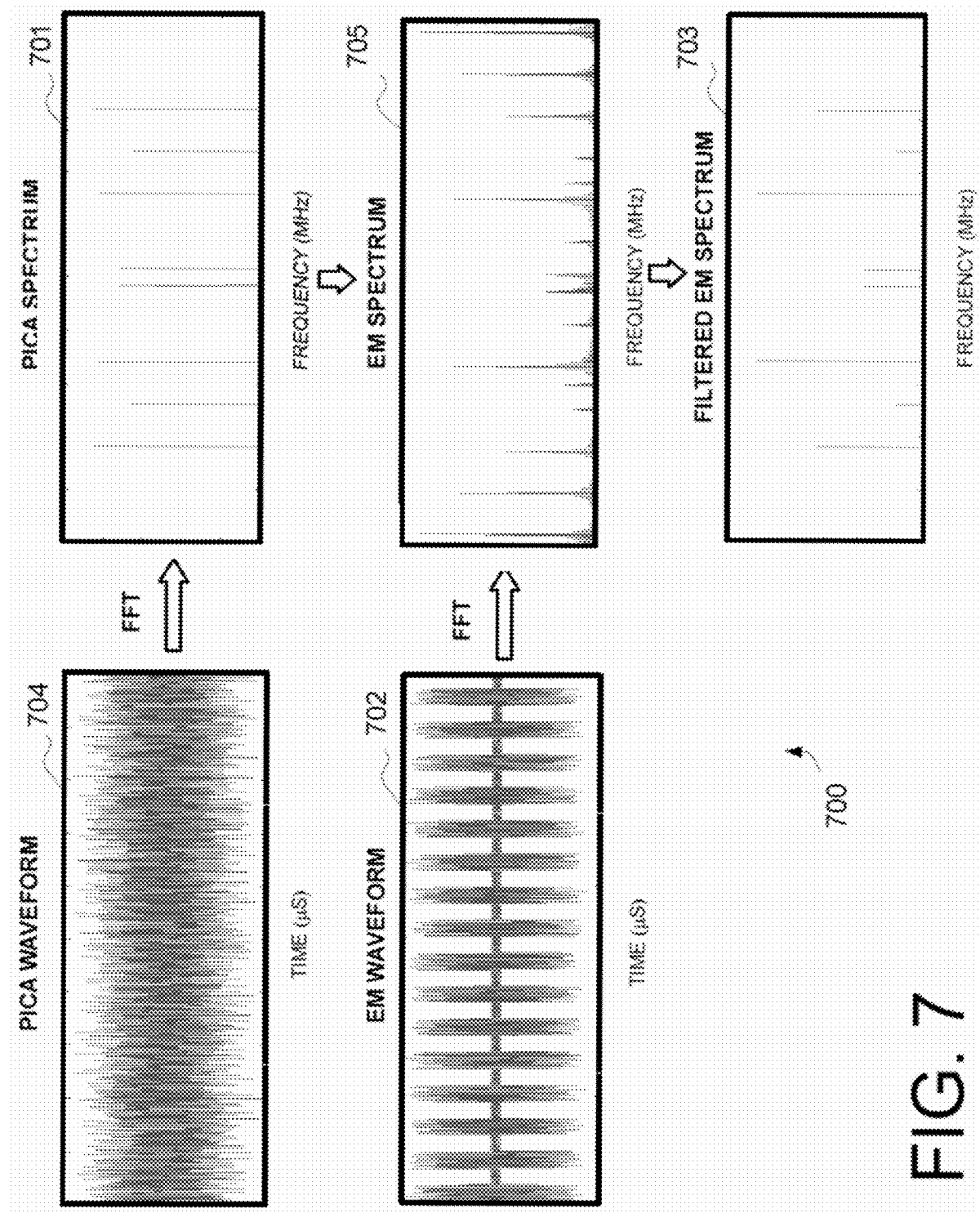
FIG. 7 illustrates an example of frequency correlation between photonic emission spectra and EM emission spectra, consistent with an exemplary embodiment.

FIG. 7 illustrates an example 700 of frequency correlation between photonic emission spectra and EM emission spectra, consistent with an exemplary embodiment. In example 700, photonic emissions and EM emissions are measured for an integrated circuit of a target device. Both measurements may undertake the same set(s) of electrical stimuli to be applied to the integrated circuit. A time-resolved PICA waveform trace 704 from photonic emission measurement is converted to a frequency spectrum 701 using FFT. Similarly, an EM emission waveform trace 702 from EM emission measurement for the same time window is also converted to an EM frequency spectrum 705. The spectral response of PICA 701 is used as a linear filter for the FFT converted EM frequency spectrum 705. The post filtration EM frequency spectrum 703 is illustratively observed to have a lower background noise level and rejection of irrelevant frequencies.

In some embodiments, regions of interest may be identified by subtraction of two different two-dimensional photonic emission images of an integrated circuit applied with two different sets of electrical stimuli. The two different sets of electrical stimuli may be selected to perform different functional operations or activate different sub-circuit blocks. A two-dimensional photonic emission image may be time-integrated data of photonic activities, meaning the number of emitted photons due to a state change of each position (which may be expressed as (X, Y) coordinates) in the integrated circuit may be cumulatively counted during the sensing time window of the photon detector. The dimensional size of (X, Y) depends on the capability of spatial resolution of the photon detector adopted for the photonic emission measurement unit. Further processing of the photon data from the sensed area of the integrated circuit may produce a two-dimensional image such that the number of emitted photons is represented by a contour plot in which the gradient density is either color-schemed or expressed by the space between successive contour lines. A bright spot in gray scale or a hot color (e.g., red) in a two-dimensional photonic emission image may indicate a region of an integrated circuit where the switching activities of gates of transistors are high compared to a dark spot or a cool color (e.g., blue).

Figure 8:
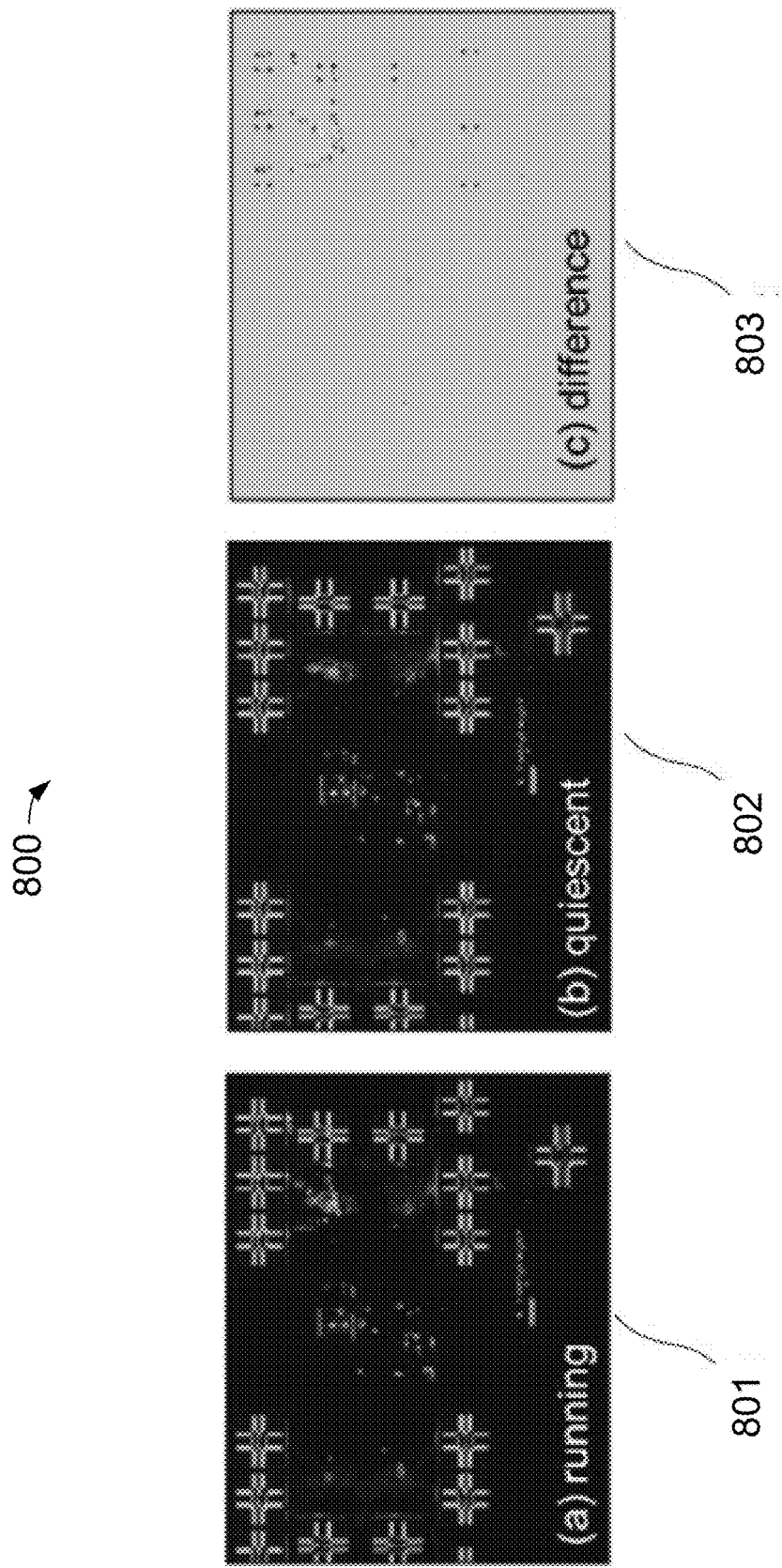
FIG. 8 illustrates an example of identification of regions of interest using PICA emission images.

FIG. 8 illustrates an example 800 of identification of regions of interest using PICA emission images. In example 800, a first PICA photonic emission image 801 is obtained with a set of electrical stimuli renders an integrated circuit of a target device to be in a "running" state to perform certain functional operations such as, for example, writing external data into a memory buffer block. A second PICA photonic emission image 802 is obtained when the set of electrical stimuli renders the integrated circuit to be in a "quiescent" state, such as a standby state in which the integrated circuit performs no or very few actions. It would be of interest to understand what regions or sub-circuit blocks are activated for the write operation. A subtraction can be carried out between the image 802 and image 801, yielding a difference image 803. Image 803 reveals some darker spots (locales of switching activities) relative to most of the background (locales of no switching activities). The darker spots in image 803 are identified as regions of high switching activities which are associated with the write operation. Different sets of electrical stimuli corresponding to different functional operations can be applied to the integrated circuit to study emission behaviors of different sub-circuit blocks, and ultimately correlating sources of switching activities to their EM emission data. In alternative embodiments, the two-dimensional photonic emission images may be measured by a LVP with a raster scanner or by a time-integrated PEM.

Figure 9:
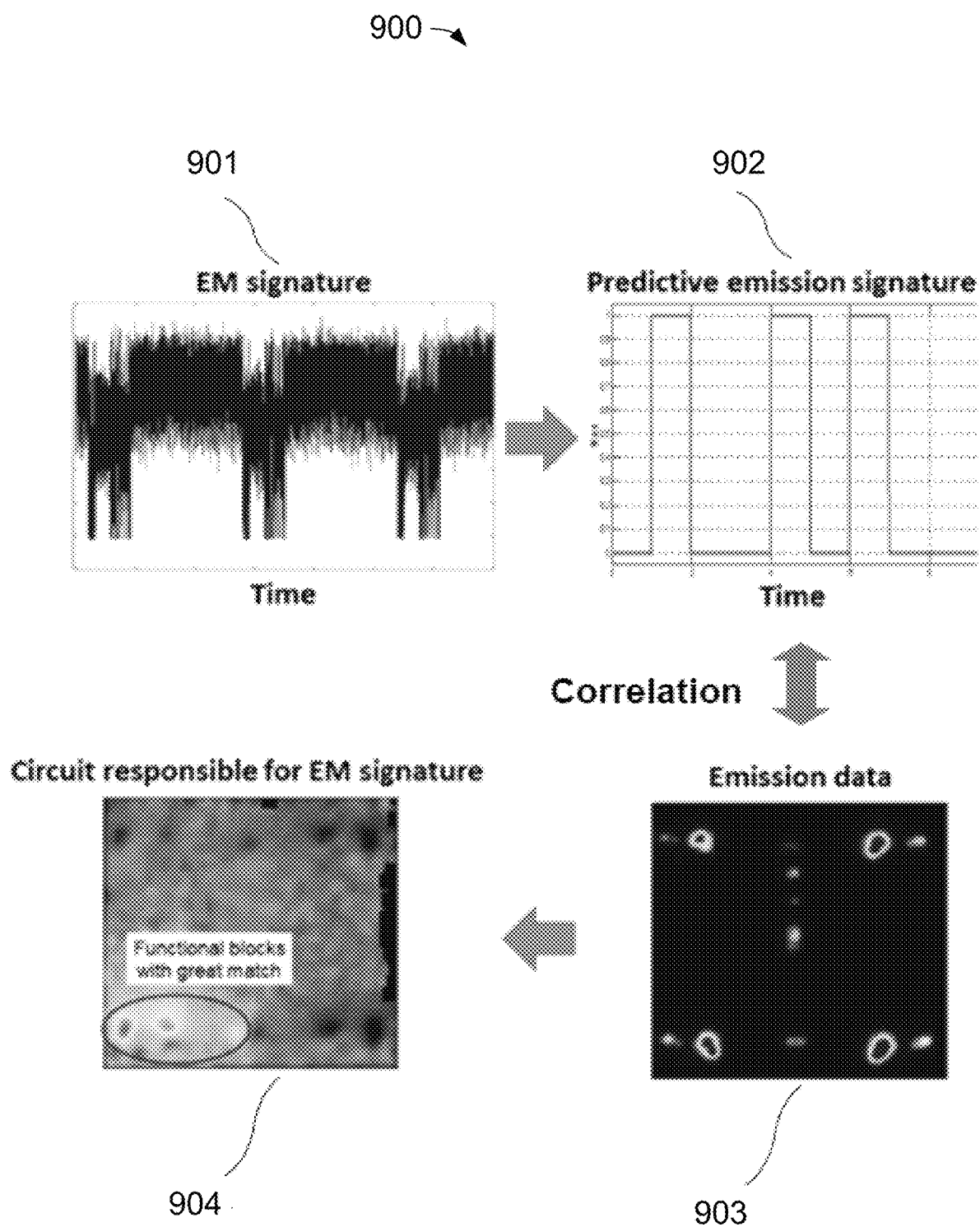
FIG. 9 illustrates an example of using EM emission signatures to identify regions of interest, consistent with an exemplary embodiment.

FIG. 9 illustrates an example 900 of using EM emission signatures to identify regions of interest, consistent with an exemplary embodiment. In example 900, an EM emission waveform 901 may be obtained for a specific sub-circuit event in an integrated circuit. Following algorithm 400 as depicted in FIG. 4 to correlate the photonic emission waveform for this specific sub-circuit event, an EM emission signature 902 with high SNR and distinct patterns may be generated. The high/low states in EM emission waveform 901, which could be rather indistinct, may be more seen as evidently low/high states in EM emission signature 902 without noisy background after correlation is performed. A photonic emission image 903 may be a result of applying a different set of electrical stimuli which may involve activities from more than one sub-circuit block. One without the layout knowledge of the integrated circuit may be interested in locating regions in the photonic emission image 903 for the previous sub-circuit event. The photonic emission image 903 can be processed as follows to identify the regions involving the specific sub-circuit event.

For each spatial resolvable location in the photonic emission image 903, a time resolved waveform may be constructed and correlated to EM emission signature 902. A figure of merit (FOM) can be assigned according to the degree of correlation, with a large FOM value indicating a high degree of correlation and a small FOM value indicating a low degree of correlation. In some embodiments, the FOM could be the amplitude of a specific peak or the area of the selected peak. A resulting image 904 may be constructed by assigning the value of FOM at each space resolvable location. In example 900, regions with higher FOM (circled in image 904) indicate a better correlated behavior with EM emission signature 902. Therefore, regions with higher FOM may be deemed as being involved with the specific sub-circuit event.

Figure 10:
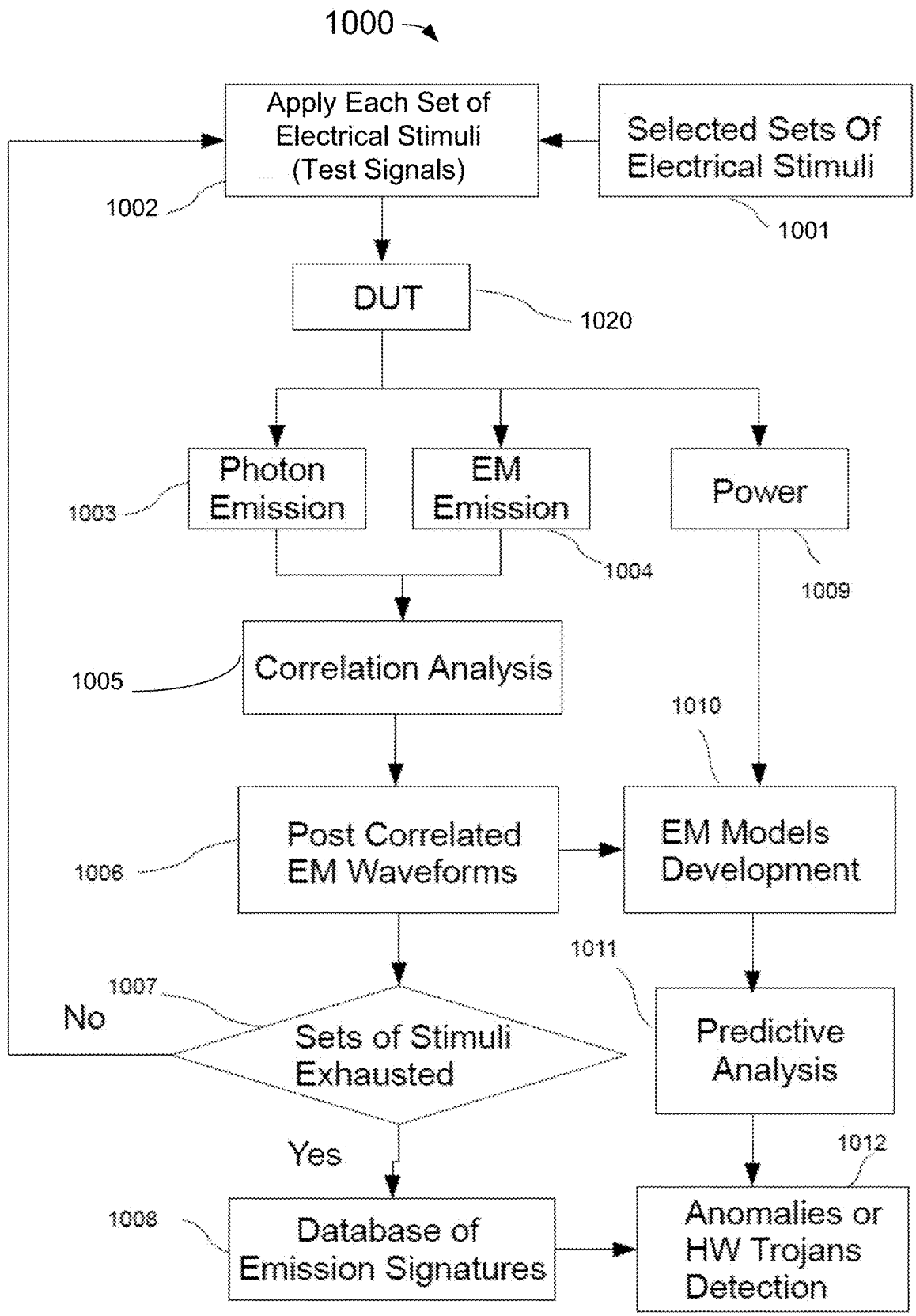
FIG. 10 illustrates an example algorithm that can develop EM emission models from correlation of photonic emission data, EM emission data and power data, consistent with an exemplary embodiment.

FIG. 10 illustrates an example algorithm 1000 that can develop EM emission models from correlation of photonic emission data, EM emission data and power data, consistent with an exemplary embodiment. Algorithm 1000 may include one or more operations, actions, or functions as represented by one or more of blocks 1001, 1002, 1003, 1004, 1005, 1006, 1007, 1008, 1009, 1010, 1011 and 1012. Although illustrated as discrete blocks, various blocks of algorithm 1000 may be divided into additional blocks, combined into fewer blocks, or eliminated, depending on the desired implementation. Algorithm 1000 may be implemented by apparatus 300 in accordance with the present disclosure. For illustrative purposes and without limitation, algorithm 1000 is described below in the context of apparatus 300.

At 1001, one or more sets of electrical stimuli, as test signals, may be selected by control unit 310 of apparatus 300 for inducing or otherwise causing a variety of electrical activities and/or activate one of more circuit blocks of an integrated circuit of a target device or DUT 1020 to perform various operations. At 1002, each set of the one or more sets of electrical stimuli may be applied to DUT 1020 by control unit 310. As various activities and/or operations in DUT 1020 are induced by each set of electrical stimuli, photonic emissions as well as EM emissions by DUT 1020 may result. At 1003, photonic emissions from DUT 1020 may be measured and recorded as photonic emission data by photonic emission measurement unit 330 of apparatus 300. At 1004, EM emissions from DUT 1020 may be measured and recorded as EM emission data by EM emission measurement unit 340 of apparatus 300. The photonic emission data may include waveforms in the time domain, frequency spectra, or two-dimensional images from PICA or LVP with a raster scan. The EM emission data may include waveforms in the time domain, frequency spectra, or near field scanning images. In addition, at 1009, power measurements may be carried out (e.g., by a power measurement unit) with the selected set of electrical stimuli to obtain instantaneous voltage and current waveforms. At 1005, correlation analysis of all three types of measurement data in the time, frequency, and space domains may be performed by data analysis unit 320 of apparatus 300 between photonic emission data and EM emission data, as well as between photonic emission data and power traces, as previously described. At 1006, temporal alignment, high SNR, interference exclusion and identification of key spectral components may thus be performed with post-correlation EM emission waveforms by data analysis unit 320 or control unit 310. At 1010, power information associated with the specific circuit operation driven by the selected set of electrical stimuli and post-correlated EM emission waveforms may be exploited by control unit 310 for the development of one or more EM emission models. At 1007, a check on the selection of electrical stimuli for testing may be performed by control unit 310. If there remains any set of electrical stimuli not yet applied to DUT 1020, the above-described process of algorithm 1000 may be repeated by control unit 310 until all sets of electrical stimuli have been applied to DUT 1020 and resultant emission data measured and recorded. Otherwise, at 1008, when the set of electrical stimuli is exhausted, a database of emission signatures corresponding to a series of distinguishing circuit operations may be established, created, maintained or otherwise updated by control unit 310. Those of ordinary skill of art would appreciate that the more emission signatures are generated, the more accurate model parameters can be extracted owing to the understanding of various sub-circuit activities and power trace profiles. Once EM emission models are instituted, at 1011, predictive analysis may be synchronized with the database by control unit 310 for monitoring the security of a given electronic hardware. At 1012, detection or identification of EM emission spectra from anomalous circuit operations and/or malware(s) can be recognized by control unit 310 when compared with emission patterns simulated with accurate EM emission models.

Example Processes

Figure 11:
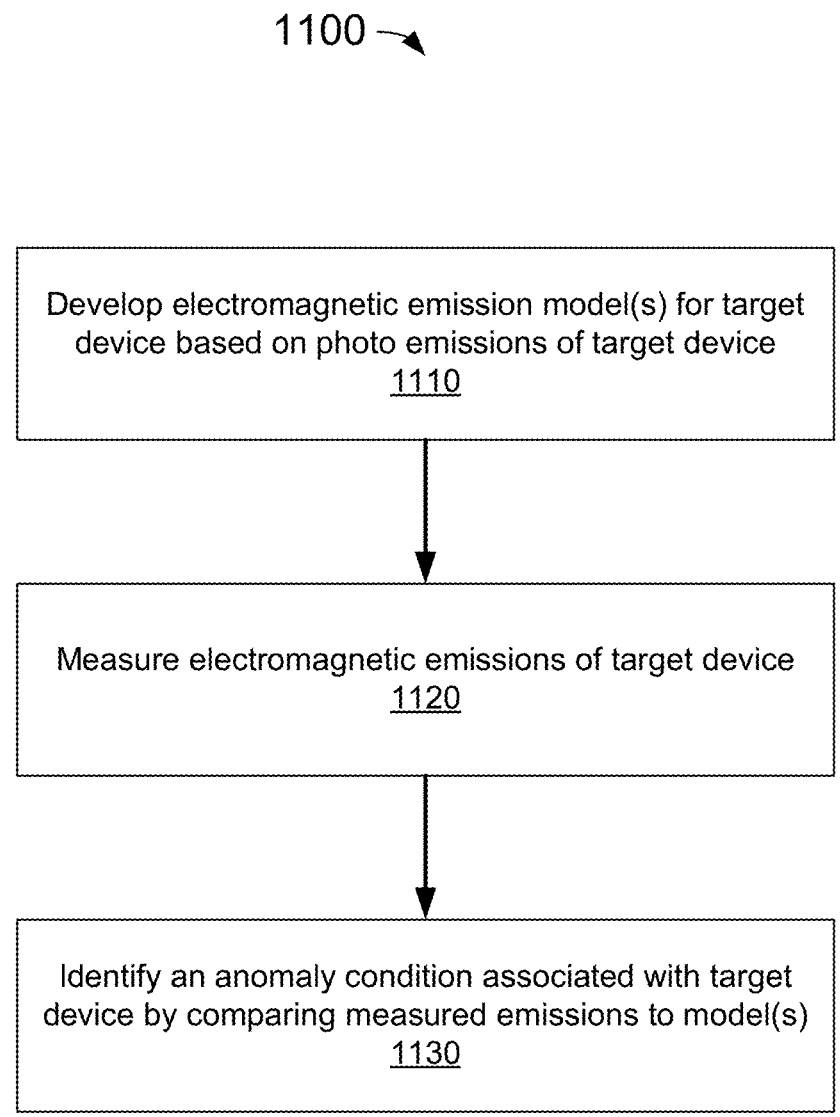
FIG. 11 illustrates an example process that can identify an anomaly condition associated with a target device, consistent with an exemplary embodiment.

FIG. 11 illustrates an example process 1100 that can identify an anomaly condition associated with a target device, consistent with an exemplary embodiment. Process 1100 may include one or more operations, actions, or functions as represented by one or more of blocks 1110, 1120 and 1130. Although illustrated as discrete blocks, various blocks of process 1100 may be divided into additional blocks, combined into fewer blocks, or eliminated, depending on the desired implementation. The blocks and sub-blocks of process 1100 may be performed in the order shown in FIG. 11 or in any other order, depending on the desired implementation. In particular, in the temporal context, block 1110 may take place after block 1120 or parallel to block 1120. Process 1100 may be implemented by apparatus 300 and any variations and/or derivatives thereof. Process 1100 may be an example implementation of algorithm 400, algorithm 600 and/or algorithm 1000, whether partially or completely. For illustrative purposes and without limitation, process 1100 is described below in the context of apparatus 300. Process 1100 may begin at block 1110.

At 1110, process 1100 may involve control unit 310 of apparatus 300 developing one or more electromagnetic emission models for a target device based on photonic emissions of the target device in a baseline context. Process 1100 may proceed from 1110 to 1120.

At 1120, process 1100 may involve EM emission measurement unit 340 of apparatus 300 measuring electromagnetic emissions of the target device in a test context different from the baseline context. Process 1100 may proceed from 1120 to 1130.

At 1130, process 1100 may involve control unit 310 identifying an anomaly condition associated with the target device by comparing a result of the measuring to the one or more electromagnetic emission models.

In some embodiments, in developing the one or more electromagnetic emission models for the target device based on the photonic emissions of the target device in the baseline context, process 1100 may involve a number of operations. For instance, process 1100 may involve recording data of the photonic emissions of the target device using PICA by photonic emission measurement unit 330 of apparatus 300 during a first period of time with the target device in one or more modes. Process 1100 may also involve recording data of the electromagnetic emissions of the target device by EM emission measurement unit 340 during the first period of time with the target device in the one or more modes. Process 1100 may further involve control unit 310 correlating the recorded data of the photonic emissions and the recorded data of the electromagnetic emissions to establish the one or more electromagnetic emission models for the target device.

In some embodiments, in measuring the electromagnetic emissions of the target device in the test context, process 1100 may involve recording data of the electromagnetic emissions of the target device by EM emission measurement unit 340 during a second period of time after the first period of time with the target device in at least one of the one or more modes.

In some embodiments, in correlating the recorded data of the photonic emissions and the recorded data of the electromagnetic emissions to establish the one or more electromagnetic emission models for the target device, process 1100 may involve apparatus 300 performing a number of operations. For instance, process 1100 may involve control unit 310 identifying transistor switching activities in one or more circuit blocks of an integrated circuit of the target device in PICA waveforms according to the recorded data of the photonic emissions of the target device. Moreover, process 1100 may involve data analysis unit 320 correlating in a time domain the identified transistor switching activities to electromagnetic emission waveforms according to the recorded data of the electromagnetic emissions of the target device to perform one or more of the following by control unit 310: (1) enabling temporal aggregation of the electromagnetic emission waveforms corresponding to a targeted event, (2) identifying one or more time frames of interest, and (3) improving a SNR in electromagnetic emission waveforms associated with the target device.

Alternatively or additionally, in correlating the recorded data of the photonic emissions and the recorded data of the electromagnetic emissions to establish the one or more electromagnetic emission models for the target device, process 1100 may involve apparatus 300 performing a number of operations. For instance, process 1100 may involve data analysis unit 320 transforming the recorded data of the photonic emissions of the target device from a time domain to a frequency domain. Additionally, process 1100 may involve control unit 310 identifying one or more frequency components in the recoded data of the photonic emissions of the target device in the frequency domain based on one or more changing circuit behaviors of one or more circuit blocks of an integrated circuit of the target device. Furthermore, process 1100 may involve data analysis unit 320 filtering, using the identified one or more frequency components, electromagnetic emission spectra according to the recorded data of the electromagnetic emissions of the target device to perform one or more of the following by control unit 310: (1) isolating a frequency of interest, (2) improving a SNR in electromagnetic emission waveforms associated with the target device, and (3) developing spectral signatures associated with one or more circuit behaviors of the integrated circuit of the target device.

In some embodiments, in recording the data of the photonic emissions of the target device using PICA with the target device in the one or more modes, process 1100 may involve apparatus 300 performing a number of operations. For instance, process 1100 may involve recording data of a first PICA emission image by photonic emission measurement unit 330 when the target device is in a first mode of the one or more modes. Process 1100 may also involve recording data of a second PICA emission image by photonic emission measurement unit 330 when the target device is in a second mode of the one or more modes. Process 1100 may further involve control unit 310 identifying a region of interest associated with one or more circuit blocks of an integrated circuit of the target device by comparing the first PICA emission image and the second PICA emission image. In some embodiments, in correlating the recorded data of the photonic emissions and the recorded data of the electromagnetic emissions to establish the one or more electromagnetic emission models for the target device, process 1100 may involve control unit 310 correlating the one or more circuit blocks performing one or more activities in the region of interest during the first period of time to electromagnetic emission signatures recorded during the first period of time.

In some embodiments, in correlating the recorded data of the photonic emissions and the recorded data of the electromagnetic emissions to establish the one or more electromagnetic emission models for the target device, process 1100 may involve apparatus 300 performing a number of operations. For instance, process 1100 may involve control unit 310 analyzing in time the data of the photonic emissions recorded during one or more circuit operations of the target device corresponding to a specific electromagnetic emission signature associated with the target device in time to identify matching photonic emission signature in time. Moreover, process 1100 may involve control unit 310 identifying one or more locations of the target device associated with the identified matching photonic emission signature in time. Additionally, process 1100 may involve control unit 310 associating the identified one or more locations of the target device to the specific electromagnetic emission signature.

Alternatively or additionally, in correlating the recorded data of the photonic emissions and the recorded data of the electromagnetic emissions to establish the one or more electromagnetic emission models for the target device, process 1100 may involve apparatus 300 a number of operations. For instance, process 1100 may involve control unit 310 analyzing in frequency the data of the photonic emissions recorded during one or more circuit operations of the target device corresponding to a specific electromagnetic emission signature associated with the target device in frequency to identify matching photonic emission signature in frequency. Additionally, process 1100 may involve control unit 310 identifying one or more locations of the target device associated with the identified matching photonic emission signature in frequency. Furthermore, process 1100 may involve control unit 310 associating the identified one or more locations of the target device to the specific electromagnetic emission signature.

In some embodiments, in identifying the anomaly condition associated with the target device, process 1100 may involve control unit 310 identifying a change in execution of one or more programs by one or more circuit blocks of an integrated circuit of the target device, activation of a malware on the target device, or both.

Figure 12:
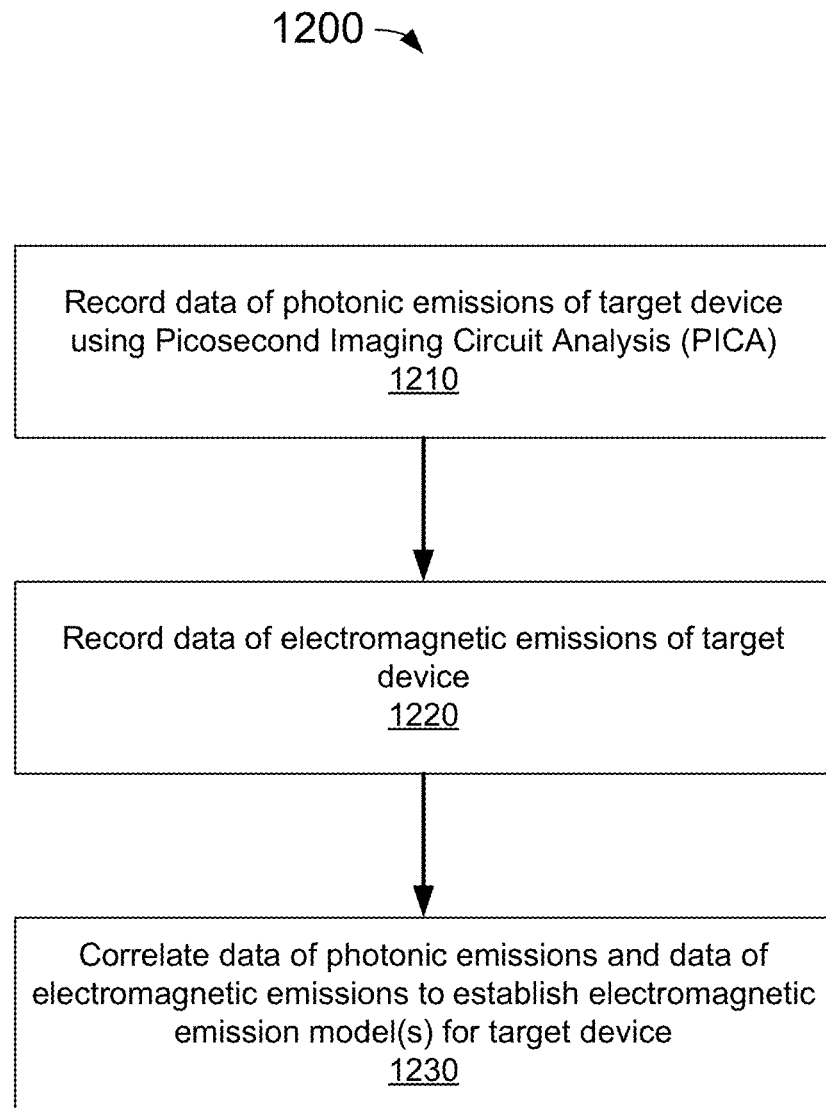
FIG. 12 illustrates an example process that can develop EM emission models for a target device, consistent with an exemplary embodiment.

FIG. 12 illustrates an example process 1200 that can develop EM emission models for a target device, consistent with an exemplary embodiment. Process 1200 may include one or more operations, actions, or functions as represented by one or more of blocks 1210, 1220 and 1230. Although illustrated as discrete blocks, various blocks of process 1200 may be divided into additional blocks, combined into fewer blocks, or eliminated, depending on the desired implementation. The blocks and sub-blocks of process 1200 may be performed in the order shown in FIG. 12 or in any other order, depending on the desired implementation. In particular, in the temporal context, block 1200 may also be executed in parallel with or before block 1210. Process 1200 may be implemented by apparatus 300 and any variations and/or derivatives thereof. Process 1200 may be an example implementation of algorithm 400, algorithm 600 and/or algorithm 1000, whether partially or completely. For illustrative purposes and without limitation, process 1200 is described below in the context of apparatus 300. Process 1200 may begin at block 1210.

At 1210, process 1200 may involve photonic emission measurement unit 330 of apparatus 300 recording data of photonic emissions of a target device using PICA during a first period of time with the target device in one or more modes. Process 1200 may proceed from 1210 to 1220.

At 1220, process 1200 may involve EM emission measurement unit 340 of apparatus 300 recording data of electromagnetic emissions of the target device during the first period of time with the target device in the one or more modes. Process 1200 may proceed from 1220 to 1230.

At 1230, process 1200 may involve control unit 310 of apparatus 300 correlating the recorded data of the photonic emissions and the recorded data of the electromagnetic emissions to establish one or more electromagnetic emission models for the target device.

In some embodiments, process 1200 may involve apparatus 300 performing one or more additional operations such as first, second, third and fourth operations described below. In the first operation, process 1200 may involve control unit 310 performing one or more of the following, based on the one or more electromagnetic emission models in a time domain: (1) enabling temporal aggregation of electromagnetic emission waveforms associated with the target device corresponding to a targeted event, (2) identifying one or more time frames of interest, and (3) improving a SNR in the electromagnetic emission waveforms associated with the target device. In the second operation, process 1200 may involve control unit 310 performing one or more of the following, based on the one or more electromagnetic emission models in a frequency domain: (1) isolating a frequency of interest, (2) improving the SNR in electromagnetic emission waveforms associated with the target device, and (3) developing spectral signatures associated with one or more circuit behaviors of an integrated circuit of the target device. In the third operation, process 1200 may, based on the one or more electromagnetic emission models in a spatial domain, involve control unit 310 identifying a region of interest associated with one or more circuit blocks of the integrated circuit of the target device. In the fourth operation, process 1200 may, based on the one or more electromagnetic emission models in the spatial domain, involve control unit 310 identifying one or more locations of the target device associated with a matching photonic emission signature in time to associate the identified one or more locations of the target device to a specific electromagnetic emission signature associated with the target device.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently. For example, any signal discussed herein may be scaled, buffered, scaled and buffered, converted to another state (e.g., voltage, current, charge, time, etc.), or converted to another state (e.g., from HIGH to LOW and LOW to HIGH) without materially changing the underlying control method. Further, bipolar transistors (e.g., PNP or NPN) can be used instead of MOS transistors in the figures described herein. A PNP may be used instead of NPN, and a PMOS may be used instead of NMOS. Accordingly, it is intended that the invention be limited only in terms of the appended claims.

Aspects of the present disclosure are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    developing one or more electromagnetic emission models for a target device based on photonic emissions of the target device in a baseline context by:
        recording data of the photonic emissions of the target device using Picosecond Imaging Circuit Analysis (PICA) during a first period of time, with the target device in one or more modes;
        recording data of the electromagnetic emissions of the target device during the first period of time with the target device in the one or more modes; and
        correlating the recorded data of the photonic emissions and the recorded data of the electromagnetic emissions to establish the one or more electromagnetic emission models for the target device;
    measuring electromagnetic emissions of the target device in a second context; and
    identifying an anomaly condition associated with the target device by comparing a result of the measuring to one or more electromagnetic emission models developed for the target device based on photonic emissions of the target device in a baseline context, wherein:
    a spectral response of the photonic emissions using PICA are used as a linear filter for the electromagnetic emission data, and
    the identifying of the anomaly condition associated with the target device comprises identifying a change in execution of one or more programs by one or more circuit blocks of an integrated circuit of the target device, activation of a malware on the target device, or both by way of a database reference.

2. The method of claim 1, wherein the measuring of the electromagnetic emissions of the target device in the test context comprises recording data of the electromagnetic emissions of the target device during a second period of time after the first period of time with the target device in at least one of the one or more modes.

3. The method of claim 1, wherein the correlating of the recorded data of the photonic emissions and the recorded data of the electromagnetic emissions to establish the one or more electromagnetic emission models for the target device comprises:
    identifying transistor switching activities in one or more circuit blocks of an integrated circuit of the target device in PICA waveforms according to the recorded data of the photonic emissions of the target device; and
    correlating in a time domain the identified transistor switching activities to electromagnetic emission waveforms according to the recorded data of the electromagnetic emissions of the target device to perform one or more of:
    enabling temporal aggregation of the electromagnetic emission waveforms corresponding to a targeted event,
    identifying one or more time frames of interest, and
    improving a signal-to-noise ratio (SNR) in electromagnetic emission waveforms associated with the target device.

4. The method of claim 1, wherein the correlating of the recorded data of the photonic emissions and the recorded data of the electromagnetic emissions to establish the one or more electromagnetic emission models for the target device comprises:
    transforming the recorded data of the photonic emissions of the target device from a time domain to a frequency domain;
    identifying one or more frequency components in the recoded data of the photonic emissions of the target device in the frequency domain based on one or more changing circuit behaviors of one or more circuit blocks of an integrated circuit of the target device; and
    filtering, using the identified one or more frequency components, electromagnetic emission spectra according to the recorded data of the electromagnetic emissions of the target device to perform one or more of:
    isolating a frequency of interest,
    improving a signal-to-noise ratio (SNR) in electromagnetic emission waveforms associated with the target device, and
    developing spectral signatures associated with one or more circuit behaviors of the integrated circuit of the target device.

5. The method of claim 1, wherein the recording of the data of the photonic emissions of the target device using PICA with the target device in the one or more modes comprises:
    recording data of a first PICA emission image when the target device is in a first mode of the one or more modes;
    recording data of a second PICA emission image when the target device is in a second mode of the one or more modes; and
    identifying a region of interest associated with one or more circuit blocks of an integrated circuit of the target device by comparing the first PICA emission image and the second PICA emission image.

6. The method of claim 5, wherein the correlating of the recorded data of the photonic emissions and the recorded data of the electromagnetic emissions to establish the one or more electromagnetic emission models for the target device comprises correlating the one or more circuit blocks performing one or more activities in the region of interest during the first period of time to electromagnetic emission signatures recorded during the first period of time.

7. The method of claim 1, wherein the correlating of the recorded data of the photonic emissions and the recorded data of the electromagnetic emissions to establish the one or more electromagnetic emission models for the target device comprises:

analyzing in time the data of the photonic emissions recorded during one or more circuit operations of the target device corresponding to a specific electromagnetic emission signature associated with the target device in time to identify matching photonic emission signature in time;

identifying one or more locations of the target device associated with the identified matching photonic emission signature in time; and associating the identified one or more locations of the target device to the specific electromagnetic emission signature.

8. The method of claim 1, wherein the correlating of the recorded data of the photonic emissions and the recorded data of the electromagnetic emissions to establish the one or more electromagnetic emission models for the target device comprises:

analyzing in frequency the data of the photonic emissions recorded during one or more circuit operations of the target device corresponding to a specific electromagnetic emission signature associated with the target device in frequency to identify matching photonic emission signature in frequency;

identifying one or more locations of the target device associated with the identified matching photonic emission signature in frequency; and associating the identified one or more locations of the target device to the specific electromagnetic emission signature.

9. The method of claim 1, further comprising assigning a figure of merit (FOM) to a degree of correlation at each space resolvable location of the target device.

10. A method, comprising:

recording data of photonic emissions of a target device using Picosecond Imaging Circuit Analysis (PICA) during a first period of time with a target device in one or more modes;

recording data of electromagnetic emissions of the target device during the first period of time with the target device in the one or more modes;

assigning a figure of merit (FOM) to a degree of correlation at each space resolvable location of the target device; and correlating the recorded data of the photonic emissions and the recorded data of the electromagnetic emissions to establish one or more electromagnetic emission models for the target device, and identifying, based on the one or more electromagnetic emission models, an anomaly condition associated with the target device comprising identifying a change in execution of one or more programs by one or more circuit blocks of an integrated circuit of the target device, activation of a malware on the target device, or both, by way of a database reference.

11. The method of claim 10, further comprising performing at least one operation of a plurality of operations comprising:

a first operation, based on the one or more electromagnetic emission models in a time domain, that performs one or more of: (1) enabling temporal aggregation of electromagnetic emission waveforms associated with the target device corresponding to a targeted event, (2) identifying one or more time frames of interest, and (3) improving a signal-to-noise ratio (SNR) in the electromagnetic emission waveforms associated with the target device;

a second operation, based on the one or more electromagnetic emission models in a frequency domain, that performs one or more of: (1) isolating a frequency of interest, (2) improving the SNR in electromagnetic emission waveforms associated with the target device, and (3) developing spectral signatures associated with one or more circuit behaviors of an integrated circuit of the target device;

a third operation, based on the one or more electromagnetic emission models in a spatial domain, that identifies a region of interest associated with one or more circuit blocks of the integrated circuit of the target device; and a fourth operation, based on the one or more electromagnetic emission models in the spatial domain, that identifies one or more locations of the target device associated with a matching photonic emission signature in time to associate the identified one or more locations of the target device to a specific electromagnetic emission signature associated with the target device.

12. The method of claim 10, wherein a spectral response of the photonic emissions using PICA are used as a linear filter for the electromagnetic emission data.

13. An apparatus, comprising:

a photonic emission measurement unit configured to measure and record data of photonic emissions of a target device with the target device in one or more modes;

an electromagnetic emission measurement unit configured to measure and record data of electromagnetic emissions of the target device with the target device in the one or more modes;

a data analysis unit configured to analyze the recorded data of the photonic emissions and the recorded data of the electromagnetic emissions to provide an analysis result; and a control unit configured to perform operations comprising:

applying one or more inputs of electrical stimuli to an integrated circuit of the target device to place the target device in the one or more modes to perform one or more operations in at least one mode of the one or more modes;

correlating the recorded data of the photonic emissions and the recorded data of the electromagnetic emissions based on the analysis result to establish one or more electromagnetic emission models for the target device; and identifying, based on the one or more electromagnetic emission models, an anomaly condition associated with the target device comprising identifying a change in execution of one or more programs by one or more circuit blocks of an integrated circuit of the target device, activation of a malware on the target device, or both, by way of a database reference, wherein:

the photonic emission measurement unit is configured to record the data of the photonic emissions of the target device using Picosecond Imaging Circuit Analysis (PICA), and a spectral response of the photonic emissions using PICA are used as a linear filter for the electromagnetic emission data.

14. The apparatus of claim 13, wherein, in correlating the recorded data of the photonic emissions and the recorded data of the electromagnetic emissions to establish the one or more electromagnetic emission models for the target device, the control unit is configured to perform operations comprising:
identifying transistor switching activities in one or more circuit blocks of an integrated circuit of the target device in PICA waveforms according to the recorded data of the photonic emissions of the target device; and
correlating in a time domain the identified transistor switching activities to electromagnetic emission waveforms according to the recorded data of the electromagnetic emissions of the target device to perform one or more of:
enabling temporal aggregation of the electromagnetic emission waveforms corresponding to a targeted event,
identifying one or more time frames of interest, and
improving a signal-to-noise ratio (SNR) in electromagnetic emission waveforms associated with the target device.

15. The apparatus of claim 13, wherein, in correlating the recorded data of the photonic emissions and the recorded data of the electromagnetic emissions to establish the one or more electromagnetic emission models for the target device, the control unit is configured to perform operations comprising:
transforming the recorded data of the photonic emissions of the target device from a time domain to a frequency domain;
identifying one or more frequency components in the recoded data of the photonic emissions of the target device in the frequency domain based on one or more changing circuit behaviors of one or more circuit blocks of an integrated circuit of the target device; and
filtering, using the identified one or more frequency components, electromagnetic emission spectra according to the recorded data of the electromagnetic emissions of the target device to perform one or more of:
isolating a frequency of interest,
improving a signal-to-noise ratio (SNR) in electromagnetic emission waveforms associated with the target device, and
developing spectral signatures associated with one or more circuit behaviors of the integrated circuit of the target device.

16. The apparatus of claim 15, wherein:
in recording the data of the photonic emissions of the target device using PICA, the photonic emission measurement unit is configured to perform operations comprising:
recording data of a first PICA emission image when the target device is in a first mode of the one or more modes; and
recording data of a second PICA emission image when the target device is in a second mode of the one or more modes;
the data analysis unit is further configured to compare the first PICA emission image and the second PICA emission image to provide a comparison result; and
the control unit is further configured to identify a region of interest associated with one or more circuit blocks of an integrated circuit of the target device based on the comparison result.

17. The apparatus of claim 16, wherein, in correlating the recorded data of the photonic emissions and the recorded data of the electromagnetic emissions based on the analysis result to establish the one or more electromagnetic emission models for the target device, the control unit is configured to correlate the one or more circuit blocks performing one or more activities in the region of interest during a first period of time to electromagnetic emission signatures recorded during the first period of time.

18. The apparatus of claim 13, wherein:
the data analysis unit is further configured to analyze in time the data of the photonic emissions recorded during one or more circuit operations of the target device corresponding to a specific electromagnetic emission signature associated with the target device in time to identify matching photonic emission signature in time; and
the control unit is further configured to perform operations comprising:
identifying one or more locations of the target device associated with the identified matching photonic emission signature in time; and
associating the identified one or more locations of the target device to the specific electromagnetic emission signature.

19. The apparatus of claim 13, wherein:
the data analysis unit is further configured to analyze in frequency the data of the photonic emissions recorded during one or more circuit operations of the target device corresponding to a specific electromagnetic emission signature associated with the target device in frequency to identify matching photonic emission signature in frequency; and
the control unit is further configured to perform operations comprising:
identifying one or more locations of the target device associated with the identified matching photonic emission signature in frequency; and
associating the identified one or more locations of the target device to the specific electromagnetic emission signature.

20. The apparatus of claim 13, wherein the control unit is further configured to assigning a figure of merit (FOM) to a degree of correlation at each space resolvable location of the target device.

* * * * *

UNITED STATES PATENT AND TRADEMARK OFFICE
CERTIFICATE OF CORRECTION

PATENT NO. : 10,521,897 B2  
APPLICATION NO. : 15/217074  
DATED : December 31, 2019  
INVENTOR(S) : Andrea Bahgat Shehata, Peilin Song and Franco Stellari Page 1 of 1

It is certified that error appears in the above-identified patent and that said Letters Patent is hereby corrected as shown below:

On the Title Page

Third Inventor, should read:
(75) Inventors: --Franco Stellari--

Signed and Sealed this
Twenty-eighth Day of January, 2020

Andrei Iancu
*Director of the United States Patent and Trademark Office*